United States Patent [19]
Elder, Jr.

[11] 3,934,099
[45] Jan. 20, 1976

[54] BIAS, FEEDBACK AND NETWORK ARRANGEMENTS FOR HYBRID CIRCUITS

[75] Inventor: Joseph Marcus Elder, Jr., Boulder, Colo.

[73] Assignee: Bell Telephone Laboratories, Incorporated, Murray Hill, N.J.

[22] Filed: Aug. 16, 1974

[21] Appl. No.: 498,056

[52] U.S. Cl. .................................. 179/170 NC
[51] Int. Cl.² ................ H04M 9/08; H04B 1/58
[58] Field of Search.... 179/170 NC, 15 AT, 15 AA, 179/81 B, 1 HF; 333/11

[56] References Cited
UNITED STATES PATENTS

| | | | |
|---|---|---|---|
| 3,480,742 | 11/1969 | Gaunt | 179/170 NC |
| 3,586,881 | 6/1971 | Gaunt | 179/170 NC |
| 3,789,154 | 1/1974 | Medill | 179/99 |
| 3,855,431 | 12/1974 | Stewart | 179/170 NC |

*Primary Examiner*—William C. Cooper
*Assistant Examiner*—Joseph Popek
*Attorney, Agent, or Firm*—F. W. Padden

[57] ABSTRACT

This specification discloses a time division communication system having a plurality of line circuits for coupling telephones over bidirectional lines to outgoing and incoming time division buses. Each of the line circuits comprises an active hybrid having separate transmit and receive operational amplifiers for connecting the outgoing and incoming buses to a telephone line via interface circuitry and during selected time slots of a time division frame. The interface circuitry comprises transformer and capacitor arrangements for coupling a bidirectional telephone line via a filter to an input of the hybrid transmit amplifier and an output of the receive amplifier. The filter together with a phase lead compensation network, a negative feedback resistor and a resistor-capacitor bias arrangement cooperate to control hybrid balance, stability and frequency response.

20 Claims, 1 Drawing Figure

U.S. Patent  Jan. 20, 1976  3,934,099
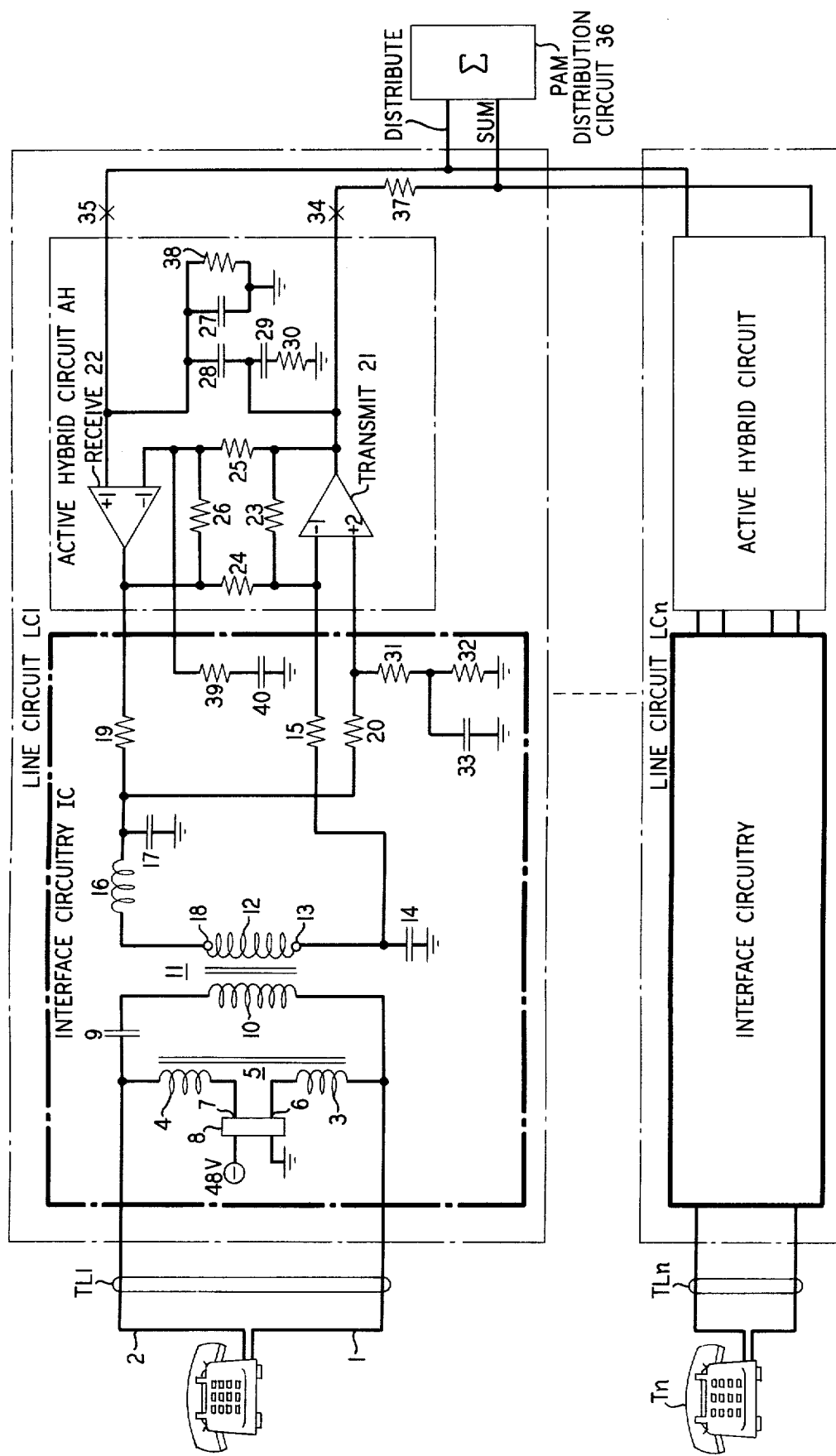

BIAS, FEEDBACK AND NETWORK ARRANGEMENTS FOR HYBRID CIRCUITS

BACKGROUND OF THE INVENTION

This invention relates to a communication systems and particularly to active hybrid port circuits for time division multiplex (TDM) communication systems.

The art has progressed to the extent that active electronic hybrid circuits are presently available for providing two-way transmission over a communication line via separate one-way transmit and receive channels of a common time division transmission link. One such electronic hybrid is disclosed in D. G. Medill et al., U.S. Pat. No. 3,789,154 of Jan. 29, 1974, as part of an electronic key telephone station circuit. Other active hybrid circuits are described in T. G. Lewis U.S. patent application Ser. No. 343,825, filed Mar. 22, 1973 now U.S. Pat. No. 3,828,146 to be issued Aug. 8, 1974, and D. G. Medill et al., U.S. patent application Ser. No. 343,824, filed Mar. 22, 1973, now U.S. Pat. No. 3,835,529.

Each of the foregoing hybrid circuits utilize capacitor arrangements for TDM signal sampling and holding together with operational amplifiers for conveying transmit and receive signals for a two-way station line to the one-way TDM transmit and receive buses. Feedback arrangements are used between the amplifiers to control signal cancellation required for precluding the transmit and receive signals from undesirably recirculating in the system. The degree of such signal cancellation depends substantially upon delicate impedance balance of, for example, the station line impedance and circuit components at the frequencies of operation.

Heretofore, it has proven to be a problem to maintain the impedance balances, and hence active hybrid stability and transmission quality over operational frequency ranges required by present day customers. Such imbalances and instability increase system susceptibility to impaired transmission fidelity, objectionable crosstalk, noise transients, and/or singing conditions.

In view of the foregoing, it is apparent that a need exists for means to improve impedance balance and stability arrangements in active hybrid circuits and particularly to achieve quality transmission with minimal crosstalk, singing and noise transients as a result of active hybrid circuit operations with a communication line in a TDM system.

SUMMARY OF THE INVENTION

In accordance with an illustrative embodiment of my invention, the foregoing problem is solved by providing electrical networks in circuitry which, by way of example, interfaces a telephone line and an active hybrid circuit to control balanced and high quality communication over a prescribed range of frequencies and through a PAM (Pulse Amplitude Modulation) TDM system. The interface circuitry controls the stability and impedance balances of hybrid operational amplifiers which control transmit and receive TDM communication.

The hybrid provides a single path for bidirectional communication over the telephone line and one-way transmission over separate transmit and receive TDM buses. Separate transmit and receive operational amplifiers are utilized in the hybrid for achieving hybrid balance and signal cancellation. Each of the amplifiers includes a single output together with inverting and noninverting inputs. Resistor pad configurations between the amplifier outputs and the inverting inputs provide feedback for cancellation of transmit and receive signals appearing at the noninverting inputs. Signal cancellation is required to preclude a signal transmitted from the telephone line over the TDM transmit channel, the TDM system and the hybrid receive amplifier from being undesirably returned to the transmitting telephone line and the hybrid transmit amplifier. In a similar fashion, signal cancellation is required to preclude a signal received by the telephone line via the hybrid from being recirculated through the hybrid transmit amplifier to the TDM buses. Without such signal cancellation and hybrid balance, echo or rain barrel transmission effects generally would occur.

According to the specific exemplary embodiment of my invention, the interfacing circuitry includes a high quality line transformer for illustratively coupling a telephone line to the hybrid. A circuit arrangement of a first winding of the transformer includes a line relay, a battery feed inductor and a DC (direct current) isolating capacitor. A second winding of the transformer is serially connected with a low frequency equalizing capacitor for reducing DC current through the transformer and for low frequency feedback to the transmit amplifier as later explained.

It is a feature of my invention that stability margins of the active hybrid is increased by connecting the second winding of the line transformer serially with an inductor to a common junction of the input network to the noninverting input of the hybrid transmit amplifier, output of the hybrid receive amplifier, and a capacitor forming an electrical filter with the inductor. The capacitor is thus connected in parallel with the second winding and the low frequency equalization capacitor. Advantageously, the inductor-capacitor filter and its specific connection arrangement reduces hybrid imbalance and improves stability margins at frequencies $nfs/2$ where $fs$ is the TDM sampling frequency and $n$ is odd. Without the filter arrangement, hybrid imbalances tend to result in TDM oscillations at the frequency $fs/2$. The imbalance is caused in part by the increased impedances of the line transformer and the line termination at frequencies above $fs/2$. It is also caused by high frequency attenuation of a TDM signal sample/hold capacitor at the noninverting input to the hybrid receive amplifier.

Although the latter filter reduces hybrid impedance imbalances at the frequency $fs/2$, I have discovered that the filter tends to degrade transmission performance by causing increased attenuation at the higher end of the voiceband frequencies. This problem is remedied, in accordance with my exemplary embodiment, by providing a phase lead compensation network including a resistor-capacitor at the inverting input to the hybrid receive amplifier for reducing signal cancellation at desired higher voiceband frequencies.

The use of a high quality line transformer results in its having a very large magnetization inductance at low frequencies. The inductance creates at a low frequency a parallel resonant impedance with the DC blocking capacitor of the first transformer winding circuitry. The resonant impedance unbalances the hybrid and causes instability by a mismatch in the voltages applied to the inverting and noninverting inputs of the hybrid transmit amplifier. Specifically, the voltage at the noninverting input of the transmit amplifier would be greater than the voltage at its inverting input due to the resonant impedance at the noninverting input.

A feature of my invention provides a solution to the low-frequency resonant impedance and increases low frequency response of the hybrid by the use of a resistor feedback arrangement from the low frequency equalization capacitor to the inverting input to the transmit amplifier. At low frequencies, the impedance of the equalization capacitor is relatively high and, accordingly, the voltage developed across it is proportionately higher than at higher frequencies. Accordingly, the feedback resistor functions as negative feedback for the transmit amplifier by connecting the capacitor voltage to the inverting input of the hybrid transmit amplifier for cancelling the undesired low frequency resonant voltage at the noninverting input to the same amplifier. This arrangement also improves the low frequency transmission through the TDM system. My illustrative interface circuitry further comprises a resistor-capacitor network for controlling the DC imbalance in the transmit amplifier resulting from the use of the feedback resistor.

DESCRIPTION OF THE DRAWING

The invention, together with its various objects and features, can be readily understood from the following more detailed description of the specific illustrative embodiment thereof read in conjunction with the accompanying single sheet of a schematic and block diagram of an exemplary TDM active hybrid circuit and interface circuitry as part of a TDM system serving telephone stations.

DETAILED DESCRIPTION

In the drawing, there are shown a plurality of telephones Tl-Tn connected over a plurality of two-wire telephone lines TL1-TLn and respective line circuits LC1-LCn to sum (send) and distribute (receive) buses shared on a TDM basis by all line circuits and other functional service circuits (not shown) of the system. The structure of each of the line circuits is essentially the same. Accordingly, only the details of circuit LC1 are disclosed and explained. It comprises two fundamental building blocks, namely, an active hybrid AH and interface circuitry IC between the hybrid and telephone line TL1.

Interface circuitry IC is equipped to supply operating −48 volts and ground potential to telephone TL1 via tip and ring leads 1 and 2 of line TL1, windings 3 and 4 of inductor 5, and lower and upper windings 6 and 7 of a line relay 8. Windings 3 and 4 of inductor 5 provide a low resistance path for DC and a relatively high impedance for frequencies above a few hertz. A capacitor 9 is serially connected with lead 2, a first winding 10 of an audio transformer 11 to lead 1 for blocking the DC supplied to telephone Tl from also flowing through winding 10. Such DC current flows through the transformer windings, even at very low levels, can cause core saturation and undesired degradation of transmission quality. Transformer 11 also furnishes protection to the electronic components of hybrid AH against hazards to which the tip and ring leads are occasionally subjected, such as lightning strikes and power line crosses.

A second winding 12 of transformer 11 has one of its terminals 13 connected to a low frequency equalization capacitor 14 which provides a low impedance path to ground for winding 12 at frequencies above approximately 300 hertz. At the lower frequencies, capacitor 14 improves transmission and reduces hybrid unbalance in accordance with my invention by cooperating with a negative feedback resistor 15 to control the gains of a hybrid transmit amplifier, as later explained.

According to another aspect of my invention, an electrical network comprising an inductor 16 and capacitor 17 couples another terminal 18 of winding 12 to hybrid AH via an impedance matching resistor 19 and a voltage divider resistor 20. The filter network performs two important functions, namely, it attenuates out-of-band energy incoming to line TL1 for preventing foldover distortion (aliasing) and it attenuates out-of-band modulation products in outgoing signals from line TL1.

Hybrid AH provides communication signal sampling, storage and transfer for the bidirectional transmission line TL1 via the interface circuitry and, advantageously, to and from the separate one-way sum (outgoing) and distribute (incoming) buses under TDM switching control. It comprises transmit and receive operational amplifiers 21 and 22, a pad of gain controlling resistors 23-26 between the amplifiers, a sample/hold capacitor 27, a sample/hold compensating capacitor 28, and a transmit pulse current supply capacitor 29 and resistor 30.

Each of the amplifiers 21 and 22 provides a flat response over the voiceband frequencies and comprises inverting and noninverting inputs, − and +, and a single output. Resistors 23 and 24 as well as resistors 25 and 26 establish the inverting and noninverting gains of amplifiers 21 and 22, respectively, for maintaining hybrid balance and desired transmission level.

Before further describing the gain controlling structure of my exemplary embodiment, it is advantageous to note that, in an endeavor to achieve quality transmission characteristics, I have found it practicable to utilize a transformer 11 which exhibits a very large magnetization inductance at low frequencies, illustratively 7 henries at 30 hertz. I have discovered that such magnetization inductance in conjunction with capacitor 9 causes a parallel resonance at low frequencies. As a result, the hybrid AH would heretofore be unbalanced and cause stability problems in TDM communications. This instability is due to a mismatch and a larger voltage fed back to the hybrid transmit amplifier 21 via resistor 20.

In accordance with my invention, the instability problem is solved by equipping the illustrative embodiment with the negative feedback compensating resistor 15 and voltage divider resistors 31 and 32 together with capacitor 33. Resistor 15 controls the variation in gain of the noninverting −input of amplifier 21 from low to high frequencies and concurrently the magnitude of the signal fed back from capacitor 14 into the −input of amplifier 21 at the lower frequencies. When the impedance of capacitor 14 is relatively large at the low frequencies, resistor 15 feeds back a larger signal (relative to high frequencies) from capacitor 14 to the −input of amplifier 21 and thereby tends to decrease the overall gain for the signal at the +input of amplifier 21. Resistors 31 and 32 and the capacitor 33 are included in the voltage divider to correct DC imbalance caused by resistor 15. Capacitor 33 is selected virtually to eliminate the influence of resistor 32 at frequencies greater than, for example, 10 hertz. The values of capacitors 14 and 33 are desirably chosen so that the effects of the DC balancing components 32 and 33 disappear before the impedance of capacitor 14 becomes small.

Resistor 19 in series with the output of the receive amplifier 22 is a hybrid matching resistor that provides an impedance match to the effective terminating impedance of the interface circuitry, telephone line TL1 and telephone T1 for achieving hybrid balance. Advantageously, the value of resistor 19 is selected to maximize return loss.

Line circuit LC1 is equipped with time division switches 34 and 35 for concurrently connecting the output of the transmit amplifier 21 and the +input of the receive amplifier 22 to the respective sum and distribute buses extending to the PAM distribution circuit 36 and during a time slot of a TDM frame selectively assigned by the TDM control equipment (not shown). At the output of amplifier 21, I advantageously utilize the resistor 30 and capacitor 29 to supply initial pulse current to the sum bus via a summing resistor 37 at the instant that the switch 34 is closed and because of the initial inability of amplifier 21 to build up pulse current for sampling the signal to be transmitted via amplifier 21 from line TL1. Resistor 30 is in series with capacitor 29 for guarding against noise and crosstalk through the power supply and, particularly, for providing sufficient damping to prevent the TDM pulse sampling transients from causing high noise crosstalk transients on the system ground.

PAM distribution circuit 36, in a manner known in the art, sums all of the signal samples in the TDM time slots appearing on the sum bus and concurrently supplies them to the distribute bus for application through closed switches, such as switch 35, to respective sample/hold capacitors, such as capacitor 27. Further to improve transmission quality, I provide a resistor 38 bridged across capacitor 27 and, specifically, to limit undesired voltage build-up across it due to leakage in switch 35 and biasing of amplifier 22. Capacitor 27 stores for an entire TDM sampling frame, the sample signal supplied to the distribute bus and, resultingly, such storage effects a reconstruction of the sampled waveform into a staircase signal in a known manner. Hybrid AH further includes the capacitor 28 connected between switches 34 and 35 on the amplifier sides thereof for forming a capacitor divider with capacitor 27 and to maintain desired hybrid balance throughout the sample frame rather than solely during instants of time slot signal sampling.

I have further discovered a stability problem in the hybrid AH which is solved by the addition of a peaking network including resistor 39 and capacitor 40 at the −input to the receive amplifier 22. The stability problem is in the balance margins at $fs/2$, where $fs$ is the sampling frequency, and particularly for multiline, or line port circuit conferencing in a single time slot. The problem is due to hybrid imbalance at $nfs/2$, where $n$ is odd. I have found that imbalances at these frequencies are effectively vector voltage summed together by the sampling at the input to the sum bus with a resulting propensity to cause oscillation at $fs/2$.

This high frequency hybrid imbalance results principally from two phenomena. First, the receive amplifier 22 tends to become unbalanced at high frequencies due to high frequency attenuation of the sample/hold capacitor 27 at the noninverting +input relative to the inverting input. Secondly, the impedance presented by the filter network components 16 and 17, and the tip and ring leads 1 and 2, termination tends to increase significantly at frequencies above $fs/2$.

To reduce the increase in impedance, I have found it advantageous to connect the capacitor 17 on the hybrid side of the inductor 16 rather than on the transformer 11 side. However, in doing so, I have further recognized that transmission performance is degraded due to the increased attenuation at the higher end of the voiceband in that configuration. A connection of the capacitor 17 on the transformer 11 side of inductor 16 results in peaking at the higher voiceband frequencies.

To remedy the premature attenuation resulting from placing capacitor 17 on the hybrid side of inductor 16 and simultaneously the degree of mismatch in the receive amplifier 22, phase-lead compensation is added by the resistor 39 and capacitor 40 connected to the −input of amplifier 22.

Hybrid AH utilizes a single transmit-receive path via inductor 16 to the telephone line TL1 and separate sum and distribute paths for TDM communication. It is important, therefore, that transmitted signals not be returned to the shared path through inductor 16 via the receive amplifier 22 and, similarly, that received signals not be returned to the transmit bus. To achieve these functions, hybrid AH requires balance. It is considered balanced when, in transmitting from telephone T1, no energy of the transmitted communication signal is received in an incoming direction on the tip and ring leads 1 and 2. The latter is accomplished in part by matched terminating impedances of the sum and distribute buses, matched impedances of resistor 19 to the terminating impedance toward telephone T1, and by feedback from the output of the transmit amplifier 21 through resistor 25 to the inverting −input of amplifier 22 for cancelling transmitted communication signals on the distribute bus from appearing at the output of amplifier 22. Hybrid AH is also considered balanced when telephone T1 receives communication signals from other line or service circuits from the distribute bus and no energy of the received communication signals at the output of amplifier 22 is returned to the sum bus. This is achieved in part with the foregoing matched conditions and by feedback from the output of the receive amplifier 22 through resistor 24 to the inverting −input of amplifier 21 which feedback is effective to cancel received signals at the +input of amplifier 21 from appearing at its output.

Hybrid AH functions under balanced conditions as follows to provide two-way voice frequency communication to line TL1 and separate one-way TDM communication over the sum and distribute buses. Illustratively, assuming that a voltage $V_R$ of a received communication signal is stored at the sample/hold capacitor 27, a $V_R$ voltage appears at the input and output of amplifier 22. Since the tip and ring leads 1 and 2 are terminated by an impedance of the telephone T1 equal to that of the matching resistor 19, a voltage $+V_R$ appears at the −input of amplifier 21 and $V_R/2$ appears at the +input of amplifier 21. Accordingly, these signal voltages are combined in amplifier 21 to produce a correspondingly zero received signal voltage at the output of amplifier 21.

For transmitting in an opposite direction, that is from telephone T1, and assuming that a voltage $V_S$ is present across the tip and ring leads 1 and 2, it appears as $V_S/2$ at the +input to the transmit amplifier 21. Further assuming that the output of amplifier 22 is at ground potential, then voltage $V_S$ appears at the output of amplifier 21. The voltage $V_S$ is summed during an assigned time slot through the PAM distribution circuit 36 and appears at the +input of amplifier 22. Accordingly, voltages $V_s$ appear at both the + and − inputs of amplifier 22 for cancellation and producing a correspondingly zero transmitted voltage at the output of amplifier 22.

By way of illustration, the following resistor, capacitor, and inductor component values have been found to be suitable for use in the illustrative line circuit.

TABLE OF COMPONENT VALUES

| Component | Value |
|---|---|
| 9 | 4 μf |
| 14 | 10 μf |
| 15 | 1458 Ohms |
| 16 | 10 mHy |
| 17 | 0.1 μf |
| 19 | 400 Ohms |
| 20 | 2050 Ohms |
| 23 | 1000 Ohms |
| 24 | 796 Ohms |
| 25 | 3160 Ohms |
| 26 | 2370 Ohms |
| 27 | 550 pF |
| 28 | 450 pF |
| 29 | 0.1 μf |
| 30 | 4.64 Ohms |
| 31 | 5110 Ohms |
| 32 | 18700 Ohms |
| 33 | 1.0 μf |
| 37 | 374 Ohms |
| 38 | 1 MEG |

It is to be understood that the hereinbefore described arrangements are illustrative of the application of principles of my invention. In light of this teaching, it is apparent that numerous other arrangements may be devised by those skilled in the art without departing from the spirit and scope of my invention.

What is claimed is:

1. A hybrid circuit for coupling an incoming and an outgoing path to a bidirectional path in a communication system and comprising
    a transmit and a receive amplifier each having input means and output means,
    means for connecting said output means of said transmit amplifier to said outgoing path,
    means for connecting said incoming path to said input means of said receive amplifier,
    means for signal feedback from said output means of said transmit amplifier to said input means of said receive amplifier for cancelling transmitted communication signals conveyed from said transmit amplifier through said communication system to said input means of said receive amplifier,
    means for signal feedback from said output means of said receive amplifier to said input means of said transmit amplifier for cancelling received communication signals conveyed from said receive amplifier output means to said input means of said transmit amplifier, and
    means for coupling said bidirectional path to said input means of said transmit amplifier and said output means of said receive amplifier,
    said coupling means including
    first and second capacitors,
    a transformer having a first winding connected to said bidirectional path in series with said first capacitor and a second winding connected in series with said second capacitor and
    means connected to said second capacitor and deriving signal feedback from said second capacitor to said input means of said transmit amplifier.

2. A hybrid circuit in accordance with claim 1 wherein said signal feedback deriving means comprises a resistor connected between said second capacitor and said input means of said transmit amplifier.

3. A hybrid circuit in accordance with claim 2 further comprising a biasing resistor-capacitor network connected to said input means of said transmit amplifier and cooperating with said resistor deriving means for feedback gain control of said transmit amplifier.

4. A hybrid circuit in accordance with claim 1 wherein said coupling means further includes a filter network having an inductor in a series circuit with said second capacitor and said second winding to said input means of said transmit amplifier and said output means of said receive amplifier, and a third capacitor connected through said inductor to said second winding.

5. A hybrid circuit in accordance with claim 2 further comprising a phase lead compensation network connected to said input means of said receive amplifier.

6. A hybrid circuit in accordance with claim 5 wherein said compensation network comprises a series resistor-capacitor arrangement.

7. A hybrid circuit for coupling a bidirectional path to an outgoing and an incoming path in a communication system and comprising
    a transmit and a receive amplifier each having first and second inputs and an output,
    means for connecting said output of said transmit amplifier to said outgoing path,
    means for connecting said incoming path to said first input of said receive amplifier,
    means for signal feedback from said transmit amplifier output to said second input of said receive amplifier for cancelling from said receive amplifier output transmitted communication signals conveyed from said transmit amplifier output through said communication system to said first input of said receive amplifier,
    means for signal feedback from said receive amplifier output to said second input of said transmit amplifier for cancelling from said transmit amplifier output received communication signals conveyed from said receive amplifier output to said first input of said transmit amplifier, and
    means for coupling said bidirectional path to said first input of said transmit amplifier and said output of said receive amplifier,
    said coupling means comprising a filter network having an inductor which is serially connected to said receive amplifier output and said first input of said transmit amplifier and a capacitor shuntingly connected to said receive amplifier output, said first input of said transmit amplifier and said inductor.

8. A hybrid circuit in accordance with claim 7 further comprising a phase lead compensation network connected to said second input of said receive amplifier.

9. A hybrid circuit in accordance with claim 8 wherein said compensation network comprises a series resistor-capacitor arrangement.

10. A hybrid circuit in accordance with claim 7 wherein said coupling means further comprises
    first and second capacitors,
    a transformer having a first winding connected to said bidirectional path in series with said first capacitor and a second winding connected in series with said second capacitor and said inductor.

11. A hybrid circuit in accordance with claim 10 wherein said coupling means further comprises
a resistor connected to said second capacitor for deriving a negative signal feedback to said second input of said transmit amplifier.

12. A hybrid circuit in accordance with claim 11 further comprising
a resistor-capacitor biasing network connected to said first input of said transmit amplifier and cooperating with said second capacitor and said resistor deriving means for feedback gain control of said transmit amplifier.

13. Hybrid circuitry for coupling a bidirectional path to an incoming and an outgoing path of an active hybrid circuit including a transmit amplifier having input means and an output means connectable to said outgoing path and comprising
first and second capacitors,
a transformer having a first winding connected in series with said first capacitor to said bidirectional path and a second winding connected in series with said second capacitor, and
means connected to said second capacitor and deriving a negative signal feedback for said input means of said transmit amplifier.

14. Hybrid circuitry in accordance with claim 13 wherein said input means comprises a first and a second input to said transmit amplifier,
said second winding is serially connectable with said second capacitor for coupling said bidirectional path to said first input,
said deriving means includes a resistor connected from said second capacitor to said second input.

15. Hybrid circuitry in accordance with claim 14 further comprising
a resistor-capacitor biasing network connectable to said first input of said transmit amplifier and for cooperating with said second capacitor and said resistor for gain control of said transmit amplifier.

16. Hybrid circuitry in accordance with claim 15, wherein
said active hybrid circuit further includes a receive amplifier having a first input connectable to said incoming path, a second input and an output, and said hybrid circuitry further comprises
a filter network including an inductor serially connected with said second capacitor and said second winding to said receive amplifier output and said first input of said transmit amplifier and a capacitor connected to said receive amplifier output and said first input of said transmit amplifier and in parallel with said inductor, second winding and second capacitor.

17. Hybrid circuitry in accordance with claim 16 further comprising
biasing means including a resistor-capacitor network connected to said second input of said receive amplifier for frequency dependent bias control thereof.

18. In circuitry for coupling a bidirectional path to an incoming and outgoing path of an active hybrid circuit including a receive amplifier having input means connectable to said incoming path and an output means connectable to said bidirectional path,
first and second capacitors and
a transformer having a first winding connected in series with said first capacitor to said bidirectional path and a second winding connected in series with said second capacitor, and the invention comprising
a filter network including an inductor serially connectable with said second capacitor and said second winding to said receive amplifier output means and a capacitor connectable to said receive amplifier output means and in parallel with said inductor, said second winding and said second capacitor.

19. The invention in accordance with claim 18 wherein said input means of said receive amplifier comprises a first input connectable to said incoming path and a second input further comprising a phase lead resistor capacitor network connected to said second input for gain control of said receive amplifier at prescribed frequencies.

20. In a time division communication system in which a plurality of time slots occur for communication and comprising
a plurality of bidirectional communication lines;
an outgoing time division bus;
an incoming time division bus;
means for exchanging signals among a plurality of selected ones of said communication lines and including
means interconnecting said outgoing and incoming buses, a plurality of line circuits, each of said circuits individually connected to a prescribed one of said lines, and time division switch means for selectively connecting said one of said lines to said outgoing and incoming buses during a distinct one of said time slots;
each of said circuits comprising
a transmit and a receive amplifier each having first and second inputs and an output,
means coupling said one of said lines to said first and second inputs of said transmit amplifier and said output of said receive amplifier and comprising
first and second capacitors,
a transformer having a first winding connected in series with said first capacitor to said bidirectional path and a second winding connected in series with said second capacitor,
an impedance matching resistor,
a biasing resistor,
a filter network including an inductor serially connected with said second capacitor, said second winding and through said matching resistor to said receive amplifier output and through said biasing resistor to said first input of said transmit amplifier and further including a capacitor connected to said matching resistor, said biasing resistor and said inductor and in parallel with said inductor, said winding and said second capacitor,
a feedback resistor connected to said capacitor and said second input of said transmit amplifier for gain control at prescribed frequencies,
a resistor-capacitor network connected to said first input of said transmit amplifier and for cooperating with said second capacitor and feedback resistor for gain control of said transmit amplifier,
a resistor pad arrangement connected between said transmit amplifier output and said second input of said receive amplifier and between said receive amplifier output and said second input of said transmit amplifier for cancelling respective transmit amplifier output signals from coupling to said one of said lines and receive amplifier output signals from coupling through said matching resistor, said biasing resistor and said transmit amplifier to said outgoing bus, a resistor-capacitor phase lead device connected to said second input of said receive amplifier and for cooperating with said filter network for controlling frequency response of said receive amplifier, a resistor-capacitor arrangement connected to said transmit amplifier output for providing output pulse current for said transmit amplifier upon closure of a time slot switch during an occurrence of said distinct one of said time slots, a sample/hold capacitor for storing a sample of a communication signal received at said first input of said receive amplifier upon closure of another time slot switch during an occurrence of said distinct one of said time slots, a resistor bridged across said sample/hold capacitor for bias control of said first input of said receive amplifier and voltage limit control on said sample/hold capacitor due to electrical leakage in said other time slot switch, and another capacitor connected between said transmit amplifier output and said first input of said receive amplifier for forming a capacitor divider with said sample/hold capacitor and said capacitor of said resistor-capacitor arrangement connected to said transmit amplifier output.

* * * * *